United States Patent
Rivers, Jr.

(10) Patent No.: US 9,318,903 B2
(45) Date of Patent: Apr. 19, 2016

(54) METHODS AND SYSTEMS FOR CONTROLLING A CHARGING DEVICE

(75) Inventor: Cecil Rivers, Jr., West Hartford, CT (US)

(73) Assignee: General Electric Company, Schenectady, NY (US)

(*) Notice: Subject to any disclaimer, the term of this patent is extended or adjusted under 35 U.S.C. 154(b) by 947 days.

(21) Appl. No.: 13/362,469

(22) Filed: Jan. 31, 2012

(65) Prior Publication Data

US 2013/0193908 A1 Aug. 1, 2013

(51) Int. Cl.
| | |
|---|---|
| *H02J 7/00* | (2006.01) |
| *B60K 1/00* | (2006.01) |
| *B60K 6/20* | (2007.10) |
| *B60W 10/24* | (2006.01) |
| *H02J 7/08* | (2006.01) |

(52) U.S. Cl.
CPC .............. *H02J 7/0032* (2013.01); *H02J 7/087* (2013.01)

(58) Field of Classification Search
CPC .................................................. H02J 7/0032
USPC .................... 320/109; 180/65.1, 65.21, 65.29
See application file for complete search history.

(56) References Cited

U.S. PATENT DOCUMENTS

| | | | |
|---|---|---|---|
| 7,795,841 B2* | 9/2010 | Matsumoto | B60L 11/182 320/108 |
| 2010/0013434 A1 | 1/2010 | Taylor-Haw et al. | |
| 2011/0140656 A1 | 6/2011 | Starr et al. | |
| 2013/0241479 A1* | 9/2013 | Wright et al. | 320/109 |

FOREIGN PATENT DOCUMENTS

CN 101273499 A 9/2008

* cited by examiner

*Primary Examiner* — Richard V Muralidar
(74) *Attorney, Agent, or Firm* — General Electric Company

(57) ABSTRACT

A charging device configured to receive power from a power source is described. The charging device includes a motion detection device configured to provide a signal corresponding to a motion of the charging device. The charging device also includes a system controller communicatively coupled to the motion detection device and configured to determine if the motion of the charging device has exceeded a predefined limit.

24 Claims, 2 Drawing Sheets

METHODS AND SYSTEMS FOR CONTROLLING A CHARGING DEVICE

BACKGROUND OF THE INVENTION

The embodiments described herein relate generally to charging of an energy storage device, and more specifically, to methods and systems for controlling a charging device used to charge an energy storage device associated with an electric vehicle.

In response to both increasing fuel costs related to the use of conventional combustion engine vehicles and heightened environmental concerns, including air pollution, the use of electric and hybrid vehicles has increased. Electric vehicles, or vehicles that include an electrochemical energy storage device, are defined herein as vehicles that derive some portion of the power used to propel the vehicle from an energy storage device, for example, from batteries. Electric vehicles may include, but are not limited to, vehicles that rely solely on energy stored in batteries to drive an electric motor that propels the vehicle (e.g., a traction motor), vehicles that include batteries for storing energy used to drive a fraction motor and also include an internal combustion engine that drives a generator used to recharge the batteries, and vehicles that include a combination of electric and fossil fuel powered components (e.g., hybrid vehicles).

Currently, charging devices, also referred to as charging stations or electric vehicle supply equipment (EVSE), provide power to an electric vehicle for charging of the energy storage devices within the electric vehicle. These charging devices provide voltages and/or currents high enough that safety precautions are taken to protect the public. Furthermore, since typically used to charge electric vehicles, these charging devices are positioned where they may be accessed by vehicles and, therefore, may also be accidently struck by such vehicles.

BRIEF DESCRIPTION OF THE INVENTION

In one aspect, a charging device configured to receive power from a power source is provided. The charging device includes a motion detection device configured to provide a signal corresponding to a motion of the charging device. The charging device also includes a system controller communicatively coupled to the motion detection device and configured to determine if the motion of the charging device has exceeded a predefined limit.

In another aspect, a method for controlling operation of a charging device that includes a charging device controller and a current controlling device is provided. The charging device is configured to output electrical power provided to the charging device by a power source. The method includes configuring a motion detection device to generate at least one signal corresponding to a movement of the charging device. The method also includes configuring the charging device controller to receive the at least one signal, determine that the movement has exceeded a predefined limit, and discontinue the output of electrical power.

In yet another aspect, a system that includes at least one charging device that includes a controller and a motion detection device configured to measure a motion of the charging device is provided. The system also includes a central controller communicatively coupled to the charging device and configured to receive a motion signal from the controller and generate an alert that the movement of the charging device has exceeded a predefined limit.

DETAILED DESCRIPTION OF THE INVENTION

The methods and systems described herein facilitate controlling a charging system. For example, the methods and systems described herein may control operation of a charging device included within the charging system and/or may control the application of power to the charging device included within the charging system. The charging device may be used to charge (i.e., provide power to) an energy storage device. The methods and systems described herein measure a movement of the charging device and discontinue charging performed by the charging device if the charging device moves more than a predefined amount. Charging devices are typically stationary devices affixed to a surface such as a parking lot, sidewalk, road, driveway, wall, and/or any other surface a vehicle may approach. Movement of the charging device is an indication that a situation has occurred that may prevent safe operation of the charging device. A situation that may cause the charging device to move is a vehicle, or other external force, striking the charging device and causing the charging device to tilt or translate with respect to the ground. After such an event, wires may be exposed and/or the charging device may be damaged in other ways that may prevent safe operation of the charging device. Other events, for example, natural events such as earthquakes, hurricanes, and tornadoes, may cause the charging device to move more than the predefined amount and are also situations where safe operation of the charging device may be compromised.

Technical effects of the methods and systems described herein include at least one of: (a) configuring a motion detection device to generate at least one signal corresponding to a movement of the charging device; and (b) configuring the charging device controller to receive the at least one signal, determine that the movement has exceeded a predefined limit, and discontinue the output of electrical power.

Figure 1:
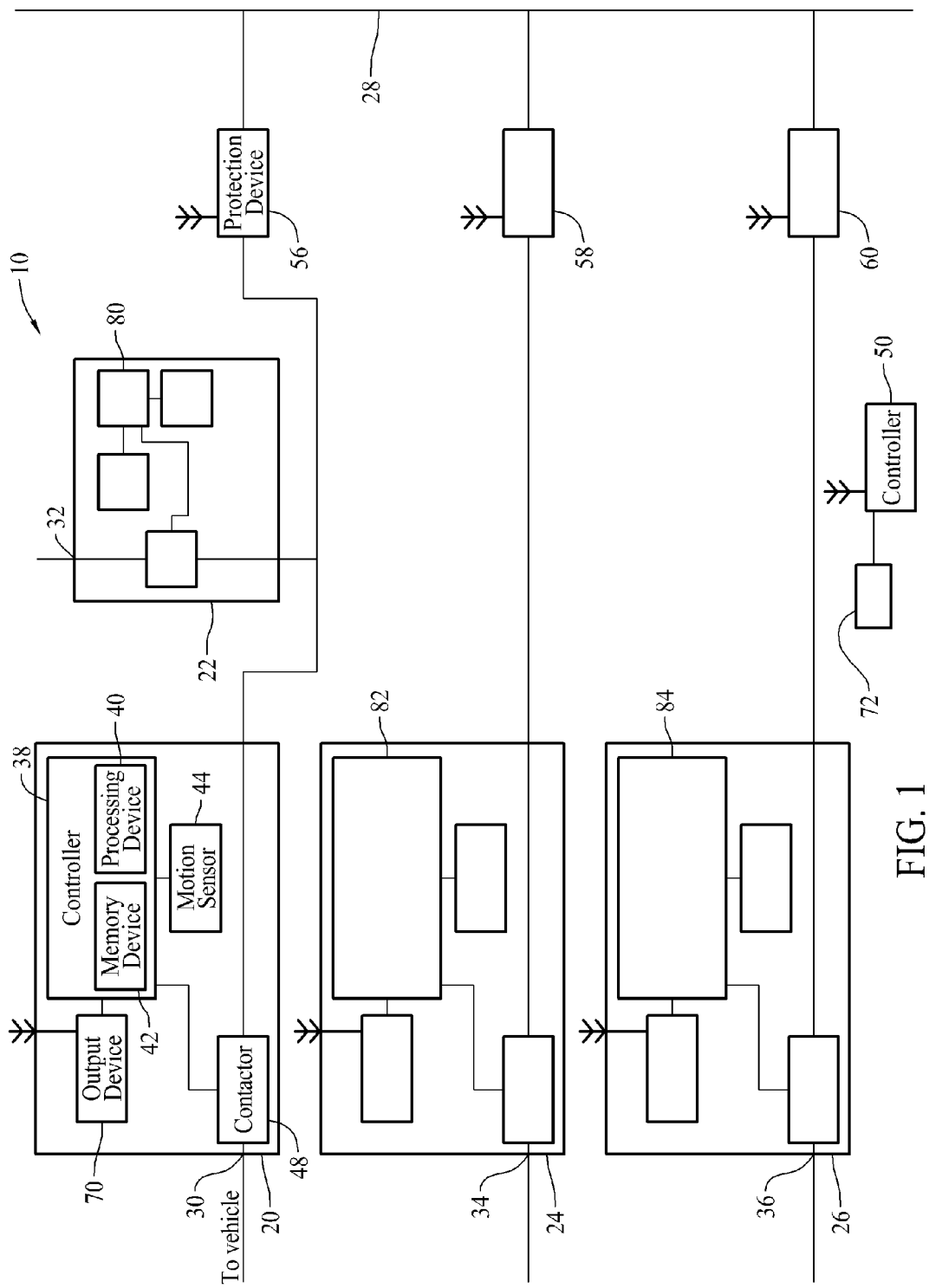
FIG. 1 is a block diagram of an exemplary charging system and associated electrical grid.

FIG. 1 is a block diagram of an exemplary charging system 10. In the exemplary embodiment, charging system 10 includes at least one charging device, for example, a first charging device 20, a second charging device 22, a third charging device 24, and a fourth charging device 26. In the exemplary embodiment, charging devices 20, 22, 24, and 26 are electric vehicle charging stations electrically coupled to an electrical grid 28 and configured to provide power to energy storage devices (e.g., batteries) included within electric vehicles. For example, an electric vehicle may be coupled to an output 30 of first charging device 20, an output 32 of second charging device 22, an output 34 of third charging device 24, and/or an output 36 of fourth charging device 26.

In the exemplary embodiment, first charging device 20 includes a controller 38. For example, controller 38 may include a processing device 40 and a memory device 42. The term controller, as used herein, may refer to central processing units, microprocessors, microcontrollers, reduced instruction set circuits (RISC), application specific integrated circuits (ASIC), logic circuits, and any other circuit or processor capable of executing the functions described herein.

In the exemplary embodiment, first charging device 20 also includes a motion detection device, for example, a motion sensor 44. Motion sensor 44 may include an accelerometer, a gyroscope, a mercury switch, and/or any other suitable motion measuring device that allows first charging device 20 to function as described herein. Motion sensor 44 is communicatively coupled to controller 38 and provides a signal to controller 38. For example, motion sensor 44 may continuously, periodically, or at random intervals provide controller 38 with a signal corresponding to a current level of motion of first charging device 20. Controller 38 may filter the signals from motion sensor 44 and determine if motion of first charging device 20 exceeds a predefined limit. Alternatively, motion sensor 44 may only provide controller 38 with a signal when movement of first charging device 20 exceeds the predefined limit.

In an embodiment, first charging device 20 is an immobile object that is fixed to a substantially stationary surface. Therefore, first charging device 20 is not expected to move relative to a predetermined point beyond a predetermined limit. For example, first charging device 20 may be coupled to a surface of a parking lot. More specifically, first charging device 20 typically extends upward, substantially perpendicular to the surface. Motion sensor 44 is configured to measure motion of first charging device 20. In one embodiment, motion sensor 44 measures whether the inclination of first charging device 20 has changed. As described herein, the inclination of first charging device 20 is an angle between device 20 and the stationary surface. Furthermore, in the exemplary embodiment, motion sensor 44 measures one or more of the following: whether first charging device 20 has translated with respect to the stationary surface, an impact applied to first charging device 20, and/or a level of vibration. Motion of first charging device 20 may exceed the predefined limit if a change in inclination of device 20 exceeds a predefined limit, if first charging device 20 translates with respect to stationary surface more than a predefined amount, if a level of impact applied to first charging device 20 exceeds a predefined level, and/or if a level of vibration measured at first charging device 20 exceeds a predefined level.

In the exemplary embodiment, first charging device 20 also includes a current controlling device 48. For example, current controlling device 48 may include a contactor and/or any other suitable device that operates to prevent current flow between output 30 of first charging device 20 and electrical grid 28. For example, contactor 48 selectively electrically couples output 30 of first charging device 20 to electrical grid 28. In the exemplary embodiment, when contactor 48 is open (i.e., preventing current flow), output 30 does not receive power from electrical grid 28. In the exemplary embodiment, controller 38 generates a motion signal corresponding to a determination that motion of first charging device 20 has exceeded the predefined limit and transmits the motion signal to contactor 48. Contactor 48 is configured to open upon receipt of the motion signal from controller 38. Opening contactor 48 discontinues charging of an electric vehicle coupled to output 30 and/or prevents charging of an electric vehicle using first charging device 20. Contactor 48 is maintained in an open position until first charging device 20 is provided with a reset signal from, for example, an operator of first charging device 20, or until motion sensor 44 indicates that first charging device 20 has been returned to its original orientation and is no longer moving.

In at least some embodiments, charging system 10 includes a central controller 50 communicatively coupled to charging devices 20, 22, 24, and/or 26. Central controller 50 provides centralized control of charging devices 20, 22, 24, and/or 26. Although illustrated as in wireless communication with charging devices 20, 22, 24, and/or 26, central controller 50 may communicate with charging devices 20, 22, 24, and/or 26 in any manner that allows charging system 10 to function as described herein.

In one embodiment, central controller 50 is also communicatively coupled to at least one circuit protection device, for example, a first circuit protection device 56, a second circuit protection device 58, and a third circuit protection device 60. Circuit protection devices 56, 58, and 60 may include, but are not limited to, disconnect switches, contactors, and/or circuit breakers that selectively couple charging devices 20, 22, 24, and 26 to electrical grid 28. More specifically, first circuit protection device 56, when open, disconnects first charging device 20 and second charging device 22 from electrical grid 28. Similarly, second circuit protection device 58, when open, disconnects third charging device 24 from electrical grid 28 and third circuit protection device 60, when open, disconnects fourth charging device 26 from electrical grid 28. Controller 38 may transmit the motion signal to central controller 50 and central controller 50 may direct circuit protection device 56 to open. Alternatively, controller 38 may transmit a signal (e.g., the motion signal) directly to circuit protection device 56 that directs circuit protection device 56 to open.

In the exemplary embodiment, first charging device 20 also includes an output device 70 communicatively coupled to controller 38. For example, output device 70 is in electrical communication with controller 38 and is configured to either wirelessly communicate with controller 38, or communicate with controller 38 in any other manner that allows first charging device 20 to function as described herein. Controller 38 is configured to provide information to an operator of charging device 20 via output device 70.

Output device 70 may include, but is not limited to including, a visual output device, an audio output device, and/or a communication device. In the exemplary embodiment, controller 38 transmits the motion signal to output device 70. The visual output device may include, a light emitting diode (LED) bar, a vacuum fluorescent display (VFD), a liquid crystal display (LCD), an LED display, and/or any other device configured to provide a visual indication to a user that movement of first charging device 20 has exceeded the predefined limit.

In one embodiment, the motion signal is provided to an audio output device that generates an audio signal indicating to a user that motion has exceeded the predefined limit. Moreover, the motion signal may be provided to a communication device that transmits the motion signal to a remote device, wherein the remote device is configured to indicate to a user that motion of first charging device 20 has exceeded the predefined limit.

In an alternative embodiment, central controller 50 includes, or is communicatively coupled to, a central output device 72. As described above with respect to output device 70, central output device 72 may include, but is not limited to including, a visual output device, an audio output device, and/or a communication device. Central output device 72 is positioned remotely from first charging device 20 and configured to provide an indication that movement of first charging device 20 has exceeded a predefined limit.

For example, and in one embodiment, the communication device transmits the motion signal to at least one of a consumer device, a central computer, and a remote display device, each of which is able to provide an indication to a user that motion of first charging device 20 has exceeded a predefined level. Examples of consumer devices include, but are not limited to, cellular phones and/or personal computers. The communication device may be configured to transmit a short message service (SMS) text message and/or an electronic mail message to the consumer device. In an alternative embodiment, the communication device transmits the motion signal to an external server (e.g., a backend server), which either provides the consumer device with access to the information, or transmits the motion signal to the consumer device.

More specifically, the communication device may facilitate wireless communication using, for example, but not limited to, radio frequency (RF) communication and/or to use wireless standards including, but not limited to, 2G, 3G, and 4G cellular standards such as LTE, EDGE, and GPRS, IEEE 802.16 Wi-Max, IEEE 802.15 ZigBee®, Bluetooth, IEEE 802.11 standards including 802.11a, 802.11b, 802.11d, 802.11e, 802.11g, 802.11h, 802.11i, 802.11j, and 802.11n, Wi-Fi®, and proprietary standards such as Z-Wave®. Wi-Fi® is a certification mark developed by the Wi-Fi Alliance, ZigBee® is a registered trademark of ZigBee Alliance, Inc. of San Ramon, Calif., and Z-Wave® is an identity mark of the Z-Wave Alliance of Milpitas, Calif.

In the exemplary embodiment, second charging device 22 includes a controller 80, third charging device 24 includes a controller 82, and fourth charging device 26 includes a controller 84. Controllers 80, 82, and 84 operate in a substantially similar manner as described above with respect to controller 38.

Figure 2:
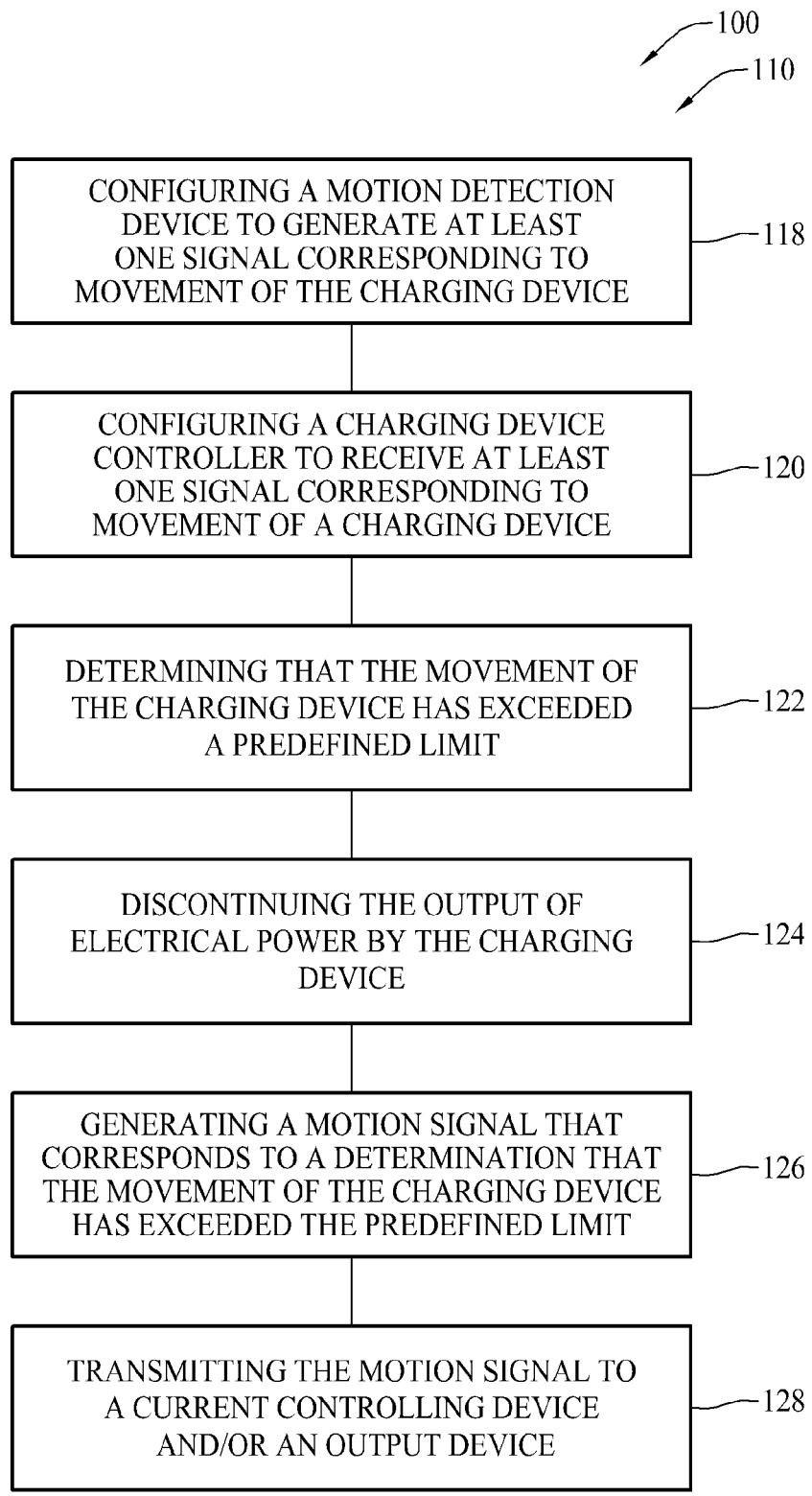
FIG. 2 is a flow chart of an exemplary method for controlling operation of the charging system shown in FIG. 1.

FIG. 2 is a flow chart 100 of an exemplary method 110 for controlling operation of charging system 10 (shown in FIG. 1). As described above, charging system 10 includes at least one charging device, for example, charging device 20 (shown in FIG. 1) and provides electrical power received from an electrical grid, for example, electrical grid 28 (shown in FIG. 1), to a load, for example, an electric vehicle. In the exemplary embodiment, method 110 includes configuring 118 a motion detection device, for example, motion sensor 44 (shown in FIG. 1), to generate at least one signal corresponding to movement of charging device 20. In the exemplary embodiment, method 110 also includes configuring 120 a charging device controller, for example, controller 38 (shown in FIG. 1) to receive the at least one signal corresponding to movement of charging device 20.

In the exemplary embodiment, method 110 also includes determining 122 that the movement of charging device 20 has exceeded a predefined limit. For example, controller 38 may determine 122 that the movement of charging device 20 has exceeded a predefined limit based on the signal from motion sensor 44. In the exemplary embodiment, method 110 also includes discontinuing 124 the output of electrical power by charging device 20.

Method 110 may also include generating 126 a motion signal that corresponds to a determination that the movement of charging device 20 has exceeded the predefined limit. For example, controller 38 may generate 126 the motion signal. Method 110 may also include transmitting 128 the motion signal to a current controlling device and/or an output device, for example, contactor 48 (shown in FIG. 1) and/or output device 70 (shown in FIG. 1). As described above, upon receipt of the motion signal, contactor 48 prevents power from being output by charging device 20. More specifically, controller 38 opens contactor 48 to prevent power from being output by charging device 20 when movement of charging device 20 has exceeded the predefined limit. Furthermore, output device 70 is configured to provide an indication that movement of charging device 20 has exceeded a predefined level and that charging device 20 is not providing output power.

In at least some embodiments, controller 38 transmits 128 the motion signal to a communication device that further transmits the motion signal to at least one user device. The user device is configured to provide an indication that movement of charging device 20 has exceeded the predefined limit. For example, the communication device may transmit the motion signal to at least one of a mobile phone, a central computer, and a remote display device. Moreover, the communication device may transmit the motion signal to a central controller, for example, central controller 50 (shown in FIG. 1). Central controller 50 may be included within an energy management system that coordinates operation of charging system 10. Upon receipt of the motion signal, central controller 50 may instruct a circuit protection device, for example, protection device 56 (shown in FIG. 1), to open, which disconnects charging device 20 from electrical grid 28 (i.e., prevents power from reaching charging device 20). Alternatively, controller 38 may directly instruct protection device 56 to open.

Although described herein with respect to a charging device and a charging system, the methods and systems described herein may also be applied to monitor the position and/or status of other equipment. For example, the methods and systems described herein may be applied to any type of "street furniture", for example, but not limited to, parking meters, traffic signals, streetlamps, and/or bus stop shelters. A controller, a motion sensor, and an output device may be coupled to, or included within, such equipment and configured to operate as described above. The methods and systems described herein may be used only to alert a user that the equipment has moved more than a predefined amount and/or to discontinue power provided to the equipment, if the equipment is a consumer of power.

Described herein are exemplary methods and systems for controlling a charging system. For example, the methods and systems described herein may control operation of a charging device included within the charging system and/or may control the application of power to the charging device. In the exemplary embodiment, the charging device is used to charge (i.e., provide power to) an energy storage device. More specifically, the methods and systems described herein measure movement of the charging device and discontinue charging performed by the charging device if the charging device moves more than a predefined amount. Since charging devices are typically stationary devices affixed to a surface such as a parking lot, sidewalk, road, driveway, and/or any other surface a vehicle may approach, movement of the charging device is an indication that a situation has occurred wherein operating the charging device may be dangerous. A situation that may cause the charging device to move is a vehicle, or other external force, striking the charging device and causing the charging device to tilt or translate with respect to the ground. After such an event, wires may be exposed and/or the charging device may be damaged in other ways that may prevent safe operation of the charging device. Other events, for example, natural events such as earthquakes, hurricanes, or tornadoes, may cause the charging device to move more than the predefined amount and are also situations where safe operation of the charging device may be compromised.

The methods and systems described herein facilitate efficient and economical operation of a charging system. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

Furthermore, unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device configured to receive power from a power source, said charging device comprising:
   a motion detection device configured to provide a signal corresponding to a motion of said charging device;
   a current controlling device operable to selectively electrically couple an output of said charging device to the power source; and
   a system controller communicatively coupled to said motion detection device and said current controlling device, said system controller configured to determine if the motion of said charging device has exceeded a predefined limit, and to control operation of said current controlling device based at least partially on the signal from said motion detection device.

2. A charging device in accordance with claim 1, wherein said system controller is configured to:
   generate a motion signal corresponding to a determination that the motion of said charging device has exceeded a predefined limit; and
   transmit the motion signal to said current controlling device, wherein said current controlling device is configured to prevent current from the power source from being output by said charging device upon receipt of the motion signal.

3. A charging device in accordance with claim 1, wherein said charging device is coupled to a surface, and wherein said system controller is configured to determine at least one of whether a change in inclination of said charging device exceeds a predefined limit, whether a translation of said charging device with respect to the surface exceeds a predefined amount, whether a level of impact applied to said charging device exceeds a predefined level, and whether a level of vibration measured at said charging device exceeds a predefined level.

4. A charging device in accordance with claim 1, further comprising an output device communicatively coupled to said system controller and configured to provide an indication to a user that the motion of said charging device has exceeded a predefined limit.

5. A charging device in accordance with claim 4, wherein said output device comprises at least one of a visual output device, an audio output device, and a communication device.

6. A charging device in accordance with claim 5, wherein said communication device is configured to transmit the motion signal to a remote device configured to provide an indication to a user that the motion of said charging device has exceeded a predefined limit.

7. A charging device in accordance with claim 6, wherein said remote device comprises at least one of a consumer device, a central controller, and a remote display device.

8. A charging device in accordance with claim 1, wherein the central controller is communicatively coupled to, and configured to control operation of, at least one circuit protection device, wherein the at least one circuit protection device is electrically coupled between said charging device and the power source and configured to selectively couple said charging device and the power source.

9. A charging device in accordance with claim 8, wherein said central controller is configured to open the circuit protection device upon receipt of the motion signal to electrically uncouple said charging device from the power source.

10. A method for controlling operation of a charging device that includes a charging device controller and a current controlling device, the charging device configured to output electrical power provided to the charging device by a power source, said method comprising:
    configuring a motion detection device to generate at least one signal corresponding to a movement of the charging device; and
    configuring the charging device controller to receive the at least one signal, determine that the movement has exceeded a predefined limit, and cause the current controlling device to prevent the output of electrical power from the charging device.

11. A method in accordance with claim 10, wherein configuring the charging device controller to determine that the movement has exceeded a predefined limit comprises configuring the charging device controller to determine at least one of whether a change in inclination of the charging device exceeds a predefined limit, whether a translation of the charging device with respect to a surface exceeds a predefined amount, whether a level of impact applied to the charging device exceeds a predefined level, and whether a level of vibration measured at the charging device exceeds a predefined level.

12. A method in accordance with claim 10, further comprising configuring the charging device controller to generate a motion signal corresponding to a determination that the movement has exceeded the predefined limit.

13. A method in accordance with claim 12, further comprising configuring the charging device controller to transmit the motion signal to the current controlling device, wherein the current controlling device is configured to prevent the output of electrical power by the charging device after receiving the motion signal.

14. A method in accordance with claim 12, further comprising configuring the charging device controller to transmit the motion signal to an output device included within the charging device.

15. A method in accordance with claim 14, further comprising configuring the output device to provide at least one of a visual and an audio indication that the movement of the charging device has exceeded the predefined limit.

16. A method in accordance with claim 14, further comprising configuring the output device to transmit the motion signal to at least one consumer device, wherein the consumer device is positioned remote from the charging device.

17. A method in accordance with claim 14, further comprising configuring the output device to transmit the motion signal to a central controller, wherein the central controller is communicatively coupled to, and configured to control operation of, at least one circuit protection device electrically coupled between the charging device and the power source and configured to selectively couple the charging device and the power source.

18. A method in accordance with claim 17, further comprising configuring the central controller to open the circuit protection device upon receipt of the motion signal to electrically uncouple the charging device from the power source.

19. A method in accordance with claim 17, further comprising configuring the charging device controller to transmit the motion signal to the at least one circuit protection device.

20. A system comprising:
    at least one charging device that includes a controller, a motion detection device configured to a measure motion of the charging device, and a current controlling device operable to selectively prevent the output of electrical power from the charging device, wherein the controller is configured to control operation of the current controlling device based at least partially on the motion measured by the motion detection device; and
    a central controller communicatively coupled to the charging device and configured to receive a motion signal from the controller and generate an alert that the movement of the charging device has exceeded a predefined limit.

21. A system in accordance with claim 20, wherein the central controller includes, or is communicatively coupled to, an output device configured to provide at least one of a visual indication and an audio indication that the movement of the charging device has exceeded the predefined limit.

22. A system in accordance with claim 21, wherein the central controller comprises at least one consumer device, wherein the consumer device is positioned remote from the charging device and includes the output device configured to provide an indication that the movement of the charging device has exceeded the predefined limit.

23. A system in accordance with claim 20, further comprising at least one circuit protection device positioned between the charging device and a power source and configured to selectively couple the charging device and the power source, wherein the central controller is communicatively coupled to, and configured to control operation of, the circuit protection device.

24. A system in accordance with claim 23, wherein the central controller is configured to operate the circuit protection device to cut off current to the charging device when movement of the charging device has exceeded the predefined limit.

* * * * *